US006356961B1

United States Patent
Oprescu-Surcobe

(10) Patent No.: US 6,356,961 B1
(45) Date of Patent: Mar. 12, 2002

(54) METHOD AND APPARATUS FOR MINIMIZING AN AMOUNT OF DATA COMMUNICATED BETWEEN DEVICES AND NECESSARY TO MODIFY STORED ELECTRONIC DOCUMENTS

(75) Inventor: Valentin Oprescu-Surcobe, Northbrook, IL (US)

(73) Assignee: Motorola, Inc., Schaumburg, IL (US)

( * ) Notice: Subject to any disclaimer, the term of this patent is extended or adjusted under 35 U.S.C. 154(b) by 0 days.

(21) Appl. No.: 08/253,998

(22) Filed: Jun. 3, 1994

(51) Int. Cl.[7] .......................... G06F 3/00; G06F 13/00; G06F 13/12

(52) U.S. Cl. ................... 710/20; 710/5; 710/7; 710/33; 710/68

(58) Field of Search ..................... 382/56; 395/700; 395/200; 341/600, 87; 364/221–222; 385/114

(56) References Cited

U.S. PATENT DOCUMENTS

| | | | | |
|---|---|---|---|---|
| 3,943,349 A | * | 3/1976 | Abel et al. ................... | 235/154 |
| 4,558,413 A | * | 12/1985 | Schmidt et al. .............. | 364/300 |
| 4,641,274 A | * | 2/1987 | Swank ......................... | 346/900 |
| 4,807,182 A | * | 2/1989 | Queen ......................... | 364/900 |
| 4,809,170 A | * | 2/1989 | Leblang et al. .............. | 395/700 |
| 4,870,415 A | * | 9/1989 | Van Maren et al. .......... | 341/94 |
| 4,941,829 A | * | 7/1990 | Estes et al. .................. | 434/118 |
| 5,155,847 A | * | 10/1992 | Kirouac et al. ............. | 395/600 |
| 5,173,854 A | * | 12/1992 | Kaufman et al. ............ | 364/419 |
| 5,335,342 A | * | 8/1994 | Pope et al. .............. | 395/183.14 |
| 5,339,368 A | * | 8/1994 | Higgins-Luthman et al. . | 382/56 |
| 5,420,965 A | * | 5/1995 | Barker, III .................. | 385/114 |

OTHER PUBLICATIONS

IEEE Transactions on Software Eng'g, vol. 15, Issue 1, Jan. 1989, S. Jajodia & D. Mitchler, "A Pessimistic Consistancy Control Algorithm for Replicated Files . . . ".*

"A Video Codec Transmtter", Lee et al., IEEE International Symposium of Circuits and Systems, NY, pp. 906–909, vol 3 of 3 vol 1002, Apr. 27, 1991.*

"New Data Transmission Technology Delivers", InfoImaging Technologies, PR NewsWire, pp. 1113, Nov. 13, 1995.*

"Kajima, Kobe Steel Launch Wide Area INS Testing", Comline Communications, pp. 41, May 6, 1987.*

"Recovery of Coded Video Sequnces From Channel Errors", Kang et al., Proceedings of the SPIE, vol. 2501, pt. 1, pp. 19–27, May 24, 1995.*

"High–Efficiency PictureTransfer Method for PC Network", Tamura et al., Journal of Institute of Televion Engineers of Japan, vol. 42, No. 2, pp. 134–140, Feb. 1988.*

* cited by examiner

Primary Examiner—Thomas Lee
Assistant Examiner—Chun Cao
(74) Attorney, Agent, or Firm—Randi L. Dulaney

(57) ABSTRACT

In a wireless and/or wireline communications system (100), a method (400–536) and apparatus (200) for minimizing an amount of data (300) communicated between a source device (107, 108, 112 or 114) and a destination device (107, 108, 112 or 114) in order to modify an electronic document stored at said destination device. Said method and/or apparatus employs method steps and apparatus structure for editing a version of the electronic document stored at the source device via a set of input commands to create an edited version of the document. Thereafter, the set of input commands are transmitted to the destination device in order to modify the version of the electronic document stored at the destination device when the set of input commands are smaller in size than edited version of the document.

21 Claims, 6 Drawing Sheets

100

300

METHOD AND APPARATUS FOR MINIMIZING AN AMOUNT OF DATA COMMUNICATED BETWEEN DEVICES AND NECESSARY TO MODIFY STORED ELECTRONIC DOCUMENTS

FIELD OF THE INVENTION

This invention relates generally to the field of data communications and more particularly to a method for minimizing an amount of data communicated from a source device to a destination device in order to modify electronic files stored at said destination.

BACKGROUND OF THE INVENTION

Modern business practices rely heavily upon the transmission and reception of electronic messages. Such messages, may include, for example, letters, memoranda, reports, electronic mail messages, graphic images, video clips, audio messages, spreadsheet information and any multimedia combinations thereof. All of the above message types shall hereinafter be generally referred to as electronic documents or simply documents. As is known in the art, these electronic documents are typically created by and stored within computer based devices such as, for example personal computers, laptop computers, desktop computers, personal digital assistants (PDAs) and the like. When the computer based devices are interconnected via a communications network, electronic documents may be communicated to individuals who are connected to the network (i.e., individuals having computer hardware capable of communicating over the network in question). It is anticipated that a document source device, as well as a destination devices may comprise portable or mobile devices that communicate via wireless communications networks such as, for example radio frequency (RF) and/or infrared (IR) communication systems.

As individuals transmit, receive, write to and otherwise annotate comments and/or modifications to the said document, thus creating an edited version thereof, it is often desirable that the edited version be communicated back to the source and to other devices on the network such that other individuals can have access.

When the communications network employs wireless technologies such as, for example, radio frequency (RF) and/or infrared (IR) transmissions, spectral efficiency and bandwidth limitations suggest minimizing the amount of data communicated back to the source or to a destination having a stored version of the said document, in order to effectuate the necessary changes. Therefore a need exists to be able to communicate a least amount of data between source and destination devices and necessary to effectuate the generation of an edited version of a document. As the throughput of wireline systems approaches the available capacity, the need to minimize the amount of data sent in order to effectuate an edited version at a destination device will likewise take on greater importance.

DETAILED DESCRIPTION OF A PREFERRED EMBODIMENT

Figure 1:
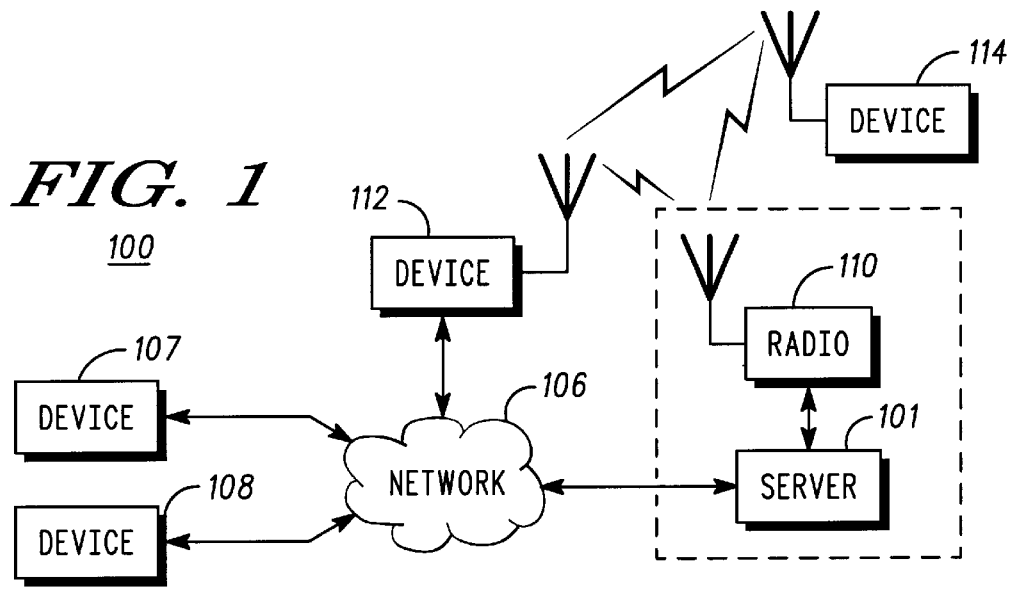
FIG. 1 is a block diagram representation of a communication system anticipated by the present invention.

FIG. 1 is a block diagram representation of a communication system 100 anticipated by the present invention. In this setting, system server 101 couples to a network 106 which may be remotely located from server 101. As will be appreciated network 106 may comprise any communications network capable of facilitating the communications of data to and from server 101 and/or between devices 107, 108 and 112, such as, for example, the Public Switching Telephone Network (PSTN), an Integrated Services Digital Network (ISDN), a Local Area Network (LAN) or any of a plurality of other publicly accessible and/or privately maintained communication networks (e.g., Cellular radio telephone networks, IRIDIUM™, and Meridian™). Via network 106, server 101 couples to other communicating devices 107 and 108.

As shown, server 101 couples to a two-way radio transceiver 110 which, in accordance with the preferred embodiment, functions as a radio frequency (RF) modem. Such modems have in the past been available under the brand name EAGLE® by contacting Motorola Inc. at 1303 East Algonquin Road, Schaumburg, Ill. 60193. It should be understood, however, that radio transceiver 110 may also comprise a multiple-channel transmitting and receiving facility having distributed or centralized channel allocation control. For example, the radio transceiver 110 may comprise a network control processor (NCP) of a Motorola trunked radio system such as the Smartnet™ system. In addition, radio transceiver 110 may comprise a DYNATAC™ series mobile telephone base station. In the past, the above-mentioned devices have been available by contacting Motorola Inc. at 1303 East Algonquin Road, Schaumburg, Ill. 60193.

When configured in accordance with FIG. 1, devices 107 and 108 can communicate directly via network 106 or may communicate electronic message signals to and from radio equipped devices 112 and 114 via radio transceiver 110, server 101 and network 106. In a similar fashion the radio equipped devices 112 and 114 can communicate directly via the depicted radio frequency (RF) network as well as to devices 107 and 108 via radio transceiver 110, server 101 and network 106. As depicted, device 112 can communicate with devices 107 or 108 via network 106. In general, devices 107, 108, 1112 and 114 may comprise laptop, desktop or notebook computers, personal digital assistants (PDAs) and the like.

Figure 2:
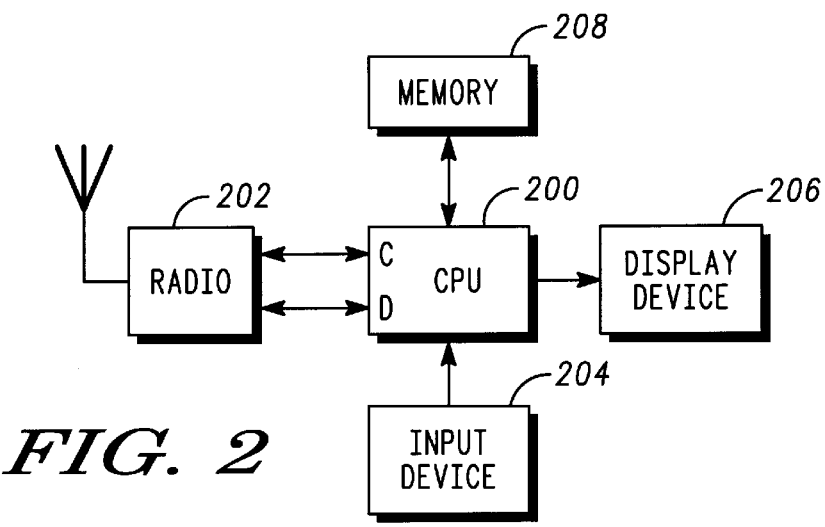
FIG. 2 is a block diagram representation of a communication device as shown in FIG. 1.

FIG. 2 is a block diagram representation of a communications device 112 or 114 as shown in FIG. 1. Each such device includes a central processing unit (CPU) 200, radio transceiver 202, input device 204, optional display device 206 and memory device 206. CPU 200 employs both control C and data D links to communicate with two-way radio transceiver 202. Radio transceiver 202 is necessarily compatible with the radio service used by radio transceiver 110 of FIG. 1. CPU 200 couples to and receives inputs from user input device 204, provides output signals to display device 206 and stores and retrieves information from memory device 208. As will be appreciated, memory device 208 maintains a set of operating program instructions which when performed by CPU 200 controls the operation of the device.

Input device 204, which enables a device operator to interface with and operate the device, may comprise any user interface which provides input signals to CPU 200. Such devices typically include, but are not limited to, alphanumeric keyboards, electronic mice, trackballs, joysticks, microphones, electronic or light pens, touch screens or any other user input devices capable of providing input signals to CPU 200. Display 206 may comprise any of the available display devices capable of presenting electronic information to the device user in a visual, audio or otherwise perceivable fashion.

For the present invention, it is important to understand that communication devices 112 and 114 are programmable platforms that can themselves be programmed to operate in accordance with the teachings of the present invention. It will be further appreciated by those skilled in the art that FIG. 2 may also suffice as a block diagram representation of devices 107 and 108 as shown in FIG. 1. In such an embodiment, radio 202 will be replaced by a network interface device, as is known in the art, consisting of appropriate registers and line drivers for communicating with network 106.

Figure 3:
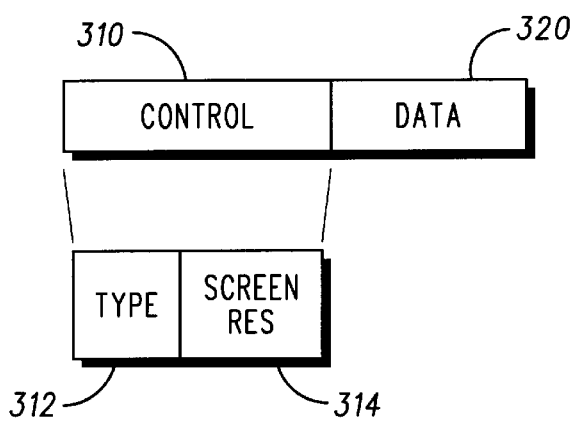
FIG. 3 is a graphical representation of the data structure utilized by the communications system of FIG. 1 to transmit and receive data.

FIG. 3 is a graphical representation of the message structure utilized by the communications system of FIG. 1 to transmit and receive information in accordance with the present invention. As shown, the message structure comprises a Control field 310 and a message or Data field 320. Control field 310 further comprises a Type field 312 and a Screen resolution field 314. Type field 312 maintains information corresponding to the information found in Data field 320. Screen resolution field 314, as is known in the art, will maintain information characterizing the size and resolution of the screen employed by display device 206.

Type field 312 is used by a receiving device to determine the format of the Data field 320 content (e.g., FULL, RECORD, FORMAT or BINARY). When Type field 314 is set to FULL, the receiving device will interpret the Data field 320 content as the complete edited version of the electronic document in question, albeit compressed. When Type field 314 is set to RECORD, the receiving device will interpret the Data field 320 content as the set of input commands, defined by the keystrokes, mouse clicks, audio and/or video edits and other user generated input command signals, that were applied to the original version of the document in question in order to generate an edited version thereof.

When Type field 314 is set to FORMAT, the receiving device will interpret the Data field 320 content as a difference file that has been generated by a well known format specific algorithm that is capable of generating such a difference file based upon a comparison between the original document and an edited version of the original document. Typically, the size of a difference file is commensurate to the amount of change made to the original document. Of note, the algorithms used to generate the above-mentioned difference file are well known in the art and will not be discussed herein in great detail. Suffice it to say, however, that the above-mentioned algorithms are file format specific and have in the past been used to provide difference calculations for format specific files such as, for example, text files as is known in the art.

Finally, when Type field 314 is set to BINARY, the receiving device will interpret the Data field 320 as a binary difference file which is created by comparing the original document and an edited version thereof on a block of bytes basis. Of times the size of a binary difference file will exceed the size of the complete edited version of the electronic document, the set of user generated input commands that define how the original document was edited or the format specific difference file, respectively.

Screen resolution field 314, as is known in the art, will maintain information characterizing the size and resolution of the screen employed by display device 206. This field is used to assure that the resolution and dimensions of the screen at the receiving device match those of the transmitting device. If not, an appropriate transformation will be performed on the data in order to assure proper display. Of note, Screen resolution field 314 is only employed when Type field 312 is set to RECORD.

Figure 4:
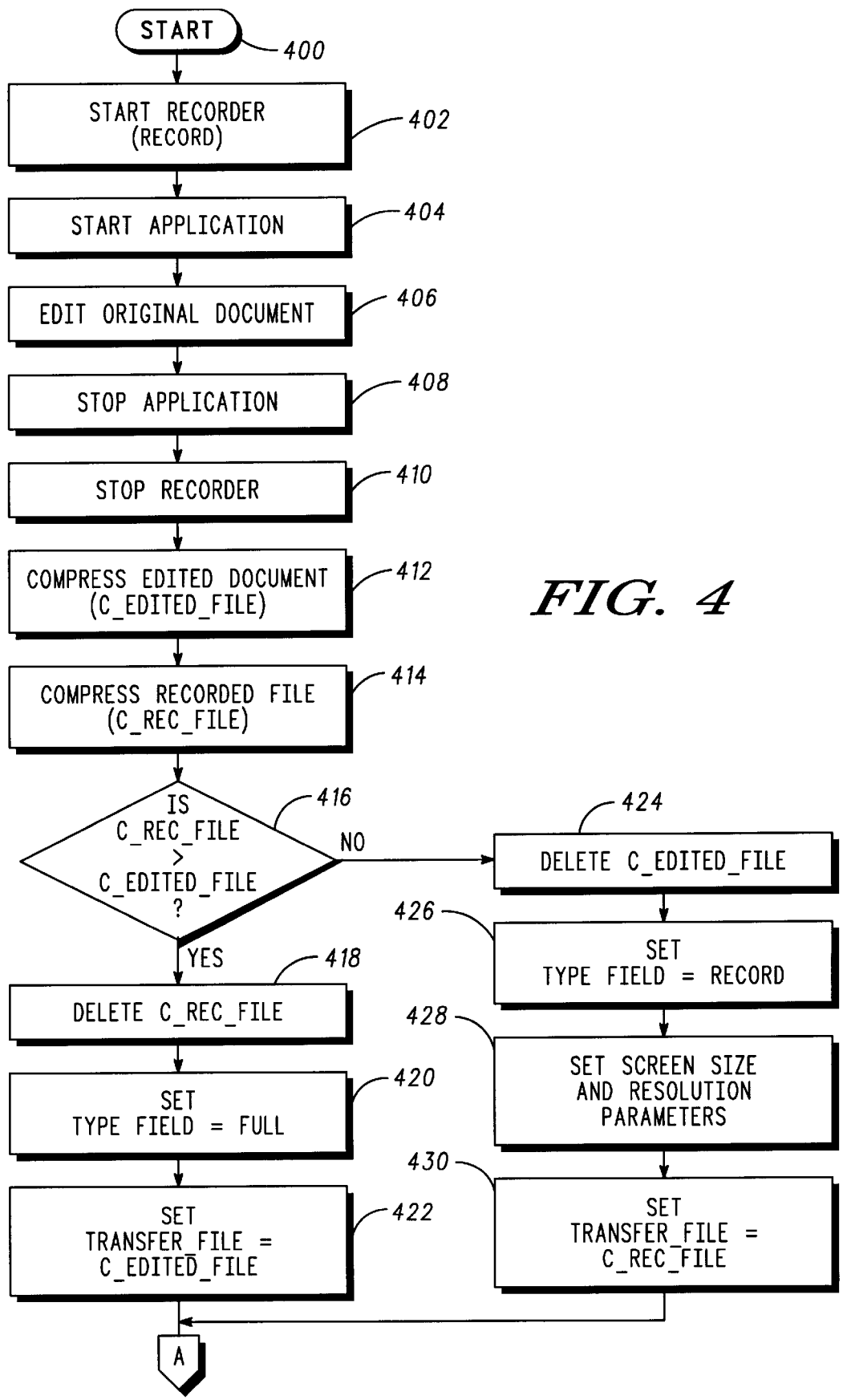
FIG. 4 is a flow chart diagram of the steps performed by a communications device of FIG. 2 in order to establish a delta file in accordance with the present invention.
Figure 4A:
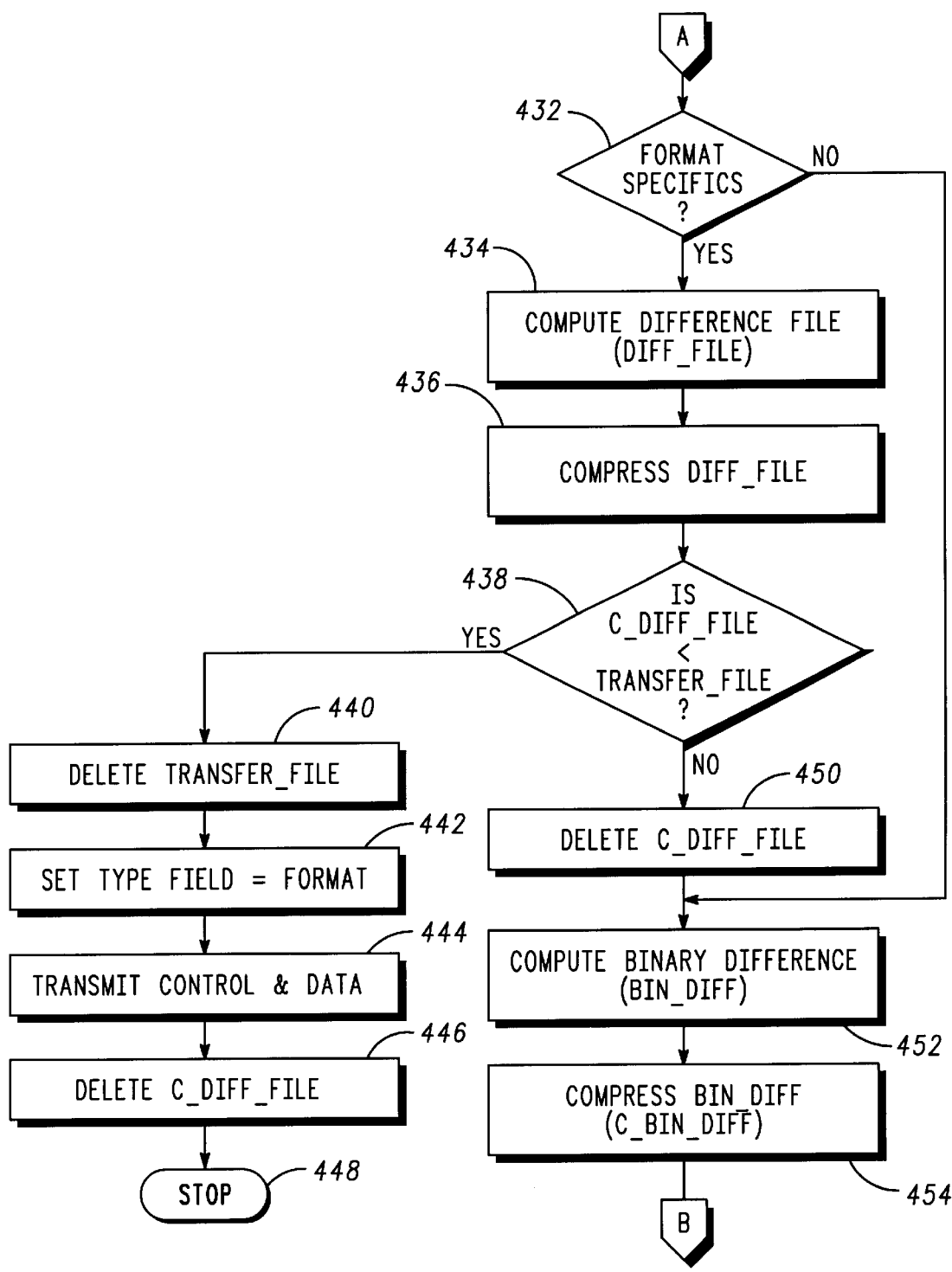
Figure 4B:
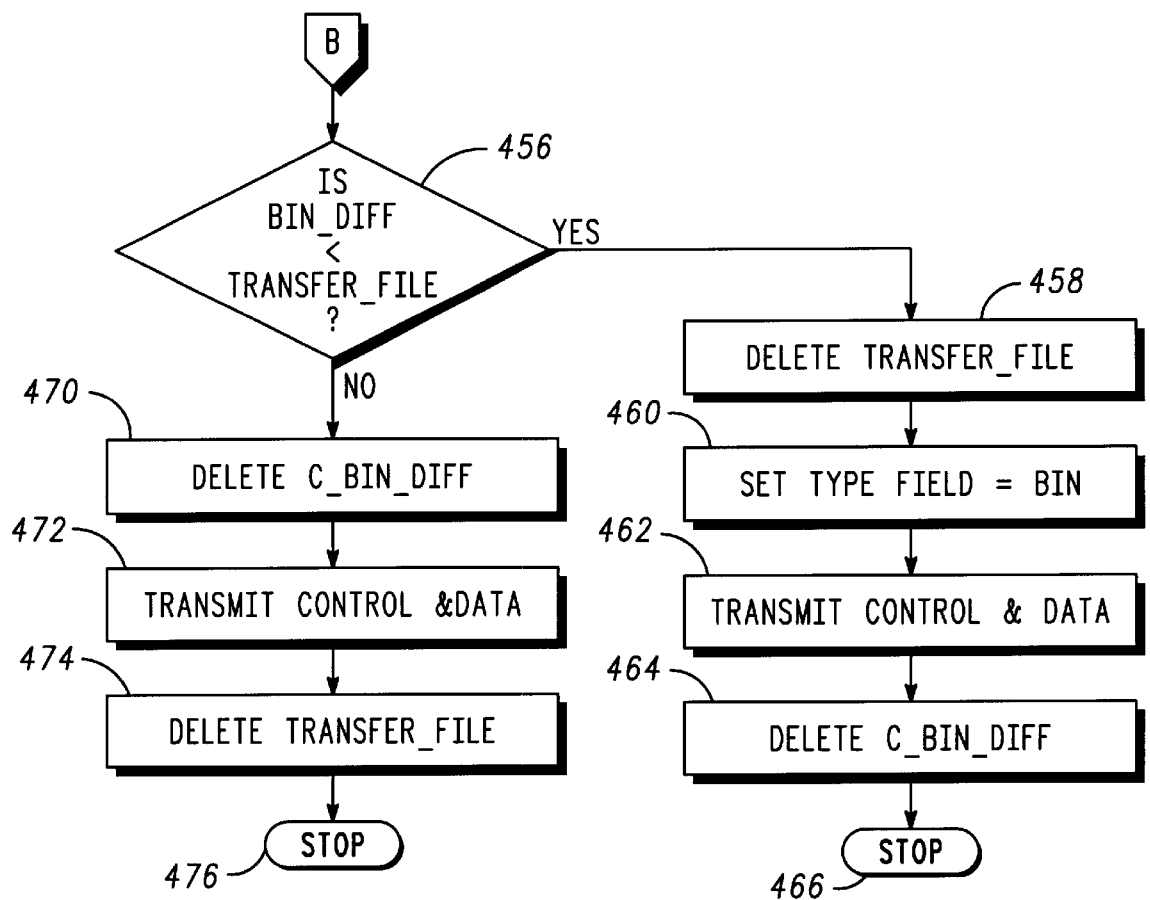

FIG. 4 is a flow chart diagram of the steps performed by CPU 200 of a source device 107, 108, 112 or 114 under the direction and control of a set of program instructions stored in memory 208 in order to determine the information for transmission to a destination device 107, 108, 112 or 114 in order to modify the version of an electronic document stored at the destination device. Prior to commencing at start block 400, it is assumed that identical versions of the electronic document in question are stored at both the source and the destination devices.

Commencing at step 400, and prior to the act of editing the original version of the document, a recorder is started at step 402, in order to capture (i.e., record) all user generated input commands or input signals that collectively define the editing operation performed upon the original document. In accordance with the preferred embodiment, the recorder of step 404 is a software program like those known in the art. Such a software program, having both record and play-back functions is the Windows™ recorder marketed by the Microsoft Corporation. In addition to the use of software implemented recorder, a hardware recording device may be employed without departing from the spirit of the present invention.

At step 404 an editing application is started (opened) and at block 406 the user commences editing the document in question. By way of example and not by way of limitation, when the document is, for example a text file, at step 404 a text editing applications program such as, for example Microsoft Word version 5.1(a) is employed to edit the text document. The above-mentioned editing application program has in the past been available by contacting the Microsoft Corporation at P.O. Box 3019 Bothel, Wash. 98041. Thus, at step 406 the user will edit the document via input device 204 of FIG. 2. Depending on the type of input device employed, the recorder of step 402 will record all keystrokes, mouse clicks, command signal entries, and similar activation's of the input devices. This set of input commands is recorded by the recorder and stored in a file. Once the document has been edited and stored, the editing application program is ended and the recorder is stopped at steps 408 and 410.

At steps 412 and 414 both a copy of the file comprising the edited version of the document (edited_file) and the file comprising the set of input commands (rec_file) are compressed in accordance with corresponding and well known compression algorithms to generate a compressed record file (C_rec_file) and a compressed edited file (C_edited_file).

Proceeding to step 416 a check is performed to determine the smaller in size of the two compressed files. Assuming the compressed recorded file is larger in size than the compressed edited file, then the compressed edited file is selected for transfer to the destination device. In accordance, at step 418 the compressed recorded file is deleted, Type field 312 of Control field 310 is set to FULL at step 420 to indicate the transfer of the complete edited document and at step 422 a pointer (transfer_file) is set to point to the compressed edited file.

Returning to step 416, if the compressed edited file is larger in size than the compressed recorded file, then the compressed recorded file is selected for transfer to the destination device. In accordance, at step 424 the compressed edited file is deleted. Thereafter, Type field 312 in the Control field 310 of transmission 300 is set to RECORD at step 426 to indicate the transmission of the set of user generated input commands as recorded by the recorder of step 402. At step 428, the source device's screen size and resolution parameters are set (i.e., placed in screen resolution field 314 of the Control field 310) and at step 430, a pointer (transfer_file) is set to point to the compressed recorded file.

Since it is the desire of the present invention to transfer the least amount of data necessary in order to effectuate modification of the original version of the document at the destination, flow proceeds from block 422 or block 430 to block 432 where a check is performed to determine whether the selected file has some known format or structure, such as, for example a text file. As is known in the art and mentioned above, certain format specific files facilitate the generation of a difference calculation (diff_file) that is the comparison of the original document and the edited version thereof. Of note, the size of the difference calculation is typically commensurate with the amount of change to the original document.

Assuming the file selected at step 416 is found, at step 432, to employ a known format that facilitates generation of a difference calculation, flow proceeds to block 434 where a difference calculation is computed in accordance with well known format specific algorithms to generate a difference file (diff_file), which is compressed at step 436 and then compared in size to the file indexed by the transfer_file at step 438 to determine the smaller of the two files.

If the size of the file indexed by the transfer_file exceeds the size of the diff_file, the indexed file is deleted at step 440 and the diff_file is selected for transfer to the destination device. In accordance, Type field 314 of Control field 310 is set to FORMAT and the compressed diff_file is used as the content of the Data field 320 of transmission 300 at step 442. Thereafter, Control field 314 together with Data field 320 are transmitted to the destination device at step 444. After transmission is completed the compressed diff_file is deleted at step 446 and the operation ceases at step 448.

Returning to step 438, if the size of the compressed diff_file exceeds the size of the file indexed by the transfer_file, the compressed diff_file will be deleted at step 450, and the process flow from block 450 or 432 proceeds to step 452 where a binary difference file (bin_diff_file) is generated based upon the binary comparison of the original document and the edited version thereof on a block of bytes basis, where the size of blocks are determined on an application by application basis. After undergoing compression at step 454, the compressed binary difference file (C_bin_diff_file) is compared in size with the file indexed by the transfer_file at step 456. If the size of the compressed binary difference file exceeds the size of the file indexed by the transfer_file, the compressed bin_diff_file will be deleted at step 470, and the file indexed by the transfer_file together with the TYPE field 312 information of Control field 310 will be transmitted to the destination device, at step 472. The operation stops at step 476, after the deletion of the indexed file and the transfer_file at step 474.

Returning to step 456, if the compressed binary difference file is smaller in size than the file indexed by the transfer_file, the file indexed by the transfer_file will be deleted, step 458, TYPE field 312 of Control field 310 will be set to BIN at step 460, and the control information together with the compressed bin_diff_file as stored in Data field 320 will be transmitted to the destination device at step 462. This operation stops at step 466, after the deletion of the compressed bin_diff_file at step 464.

Figure 5A:
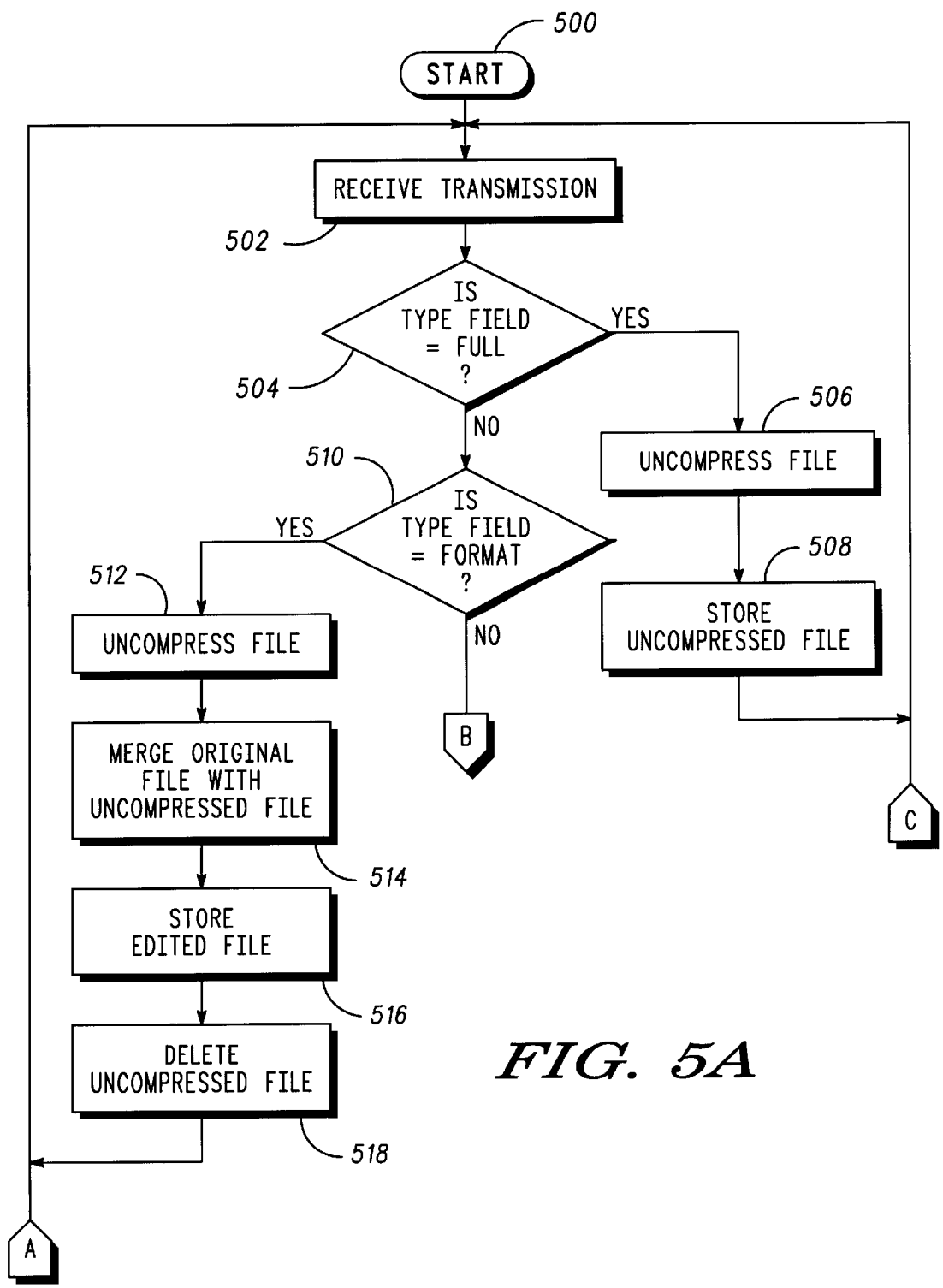
FIG. 5 is a flow chart diagram of the steps performed by a communications device of FIG. 2 upon reception of a delta file in order to modify a stored document.
Figure 5B:
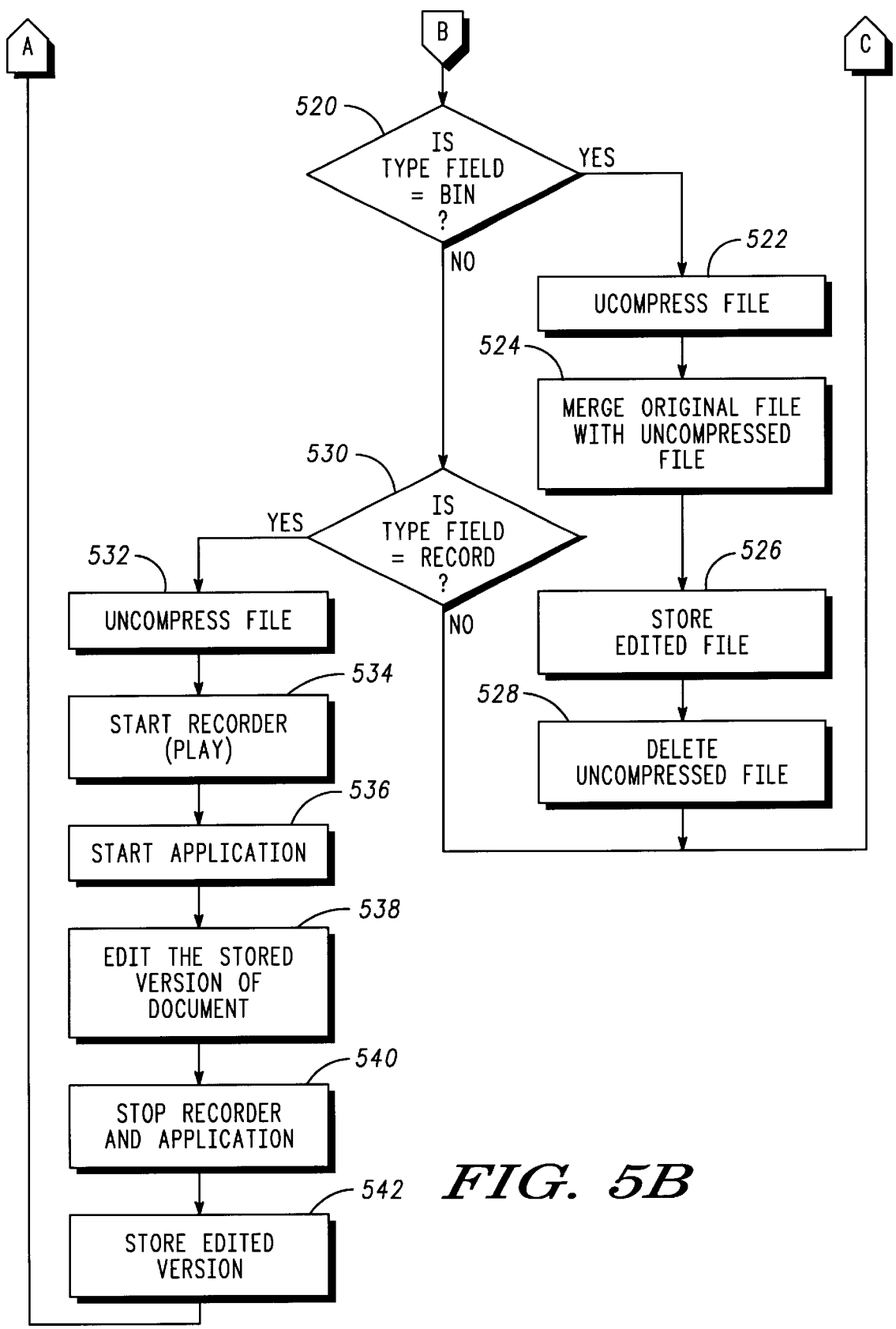

FIG. 5 is a flow chart diagram of the steps performed by CPU 200 of a destination device 107, 108, 112 or 114 upon reception of a transmission 300 in accordance with the present invention. Beginning at step 500, flow proceeds to step 502 where a destination device, typically after some delay, receives a transmission 300 comprising Control field 310 and Data field 320. As previously mentioned, Control field 310 contains an indication of the format or type of the information within Data field 320. Thus, at steps 504, 510, 520 and 530, CPU 200 performs various checks to determine the content (FULL, RECORD, FORMAT, BIN) of TYPE field 312. At step 504 a check is performed to determine whether TYPE field 312 is set to FULL. If so, flow proceeds to block 506, where the receiving device interprets the information within Data field 320 as the compressed full text version of the edited document. Thus at block 506, the compressed version of the edited document is simply uncompressed and substituted for the version of the document stored in destination device at step 508.

Assuming it is determined that TYPE field 312 is set to FORMAT at step 510, flow proceeds to block 512 where the compressed version of the format specific difference file (C_diff_file) is uncompressed into the difference file (diff_file). At step 514 the difference file is then merged with the version of the document stored at the destination device in order to create the edited version of the document. Thereafter, the newly edited version of the document is stored at step 516 while the difference file is deleted at step 518. Of note, the merge operation between the difference file and the file containing the original version of the document is well known in the art and therefore requires no additional discussion.

Assuming it is determined that TYPE field 312 is set to BIN at step 520, flow proceeds to block 522 where the compressed version of the binary difference file (C_bin_diff_file) is uncompressed into the binary difference file (bin_diff_file). At step 524 the uncompressed binary difference file is then merged with the binary version of the document stored at the destination in order to create the edited version of the document. Thereafter, the edited version of the document is stored at step 526, while the uncompressed binary difference file is deleted at step 528. Of note, the merge operation between the binary difference file and the binary file containing the original version of the document is well known in the art and therefore requires no additional discussion at this time.

Assuming, on the other hand, that it is determined that TYPE field 312 is set to RECORD at step 530, flow proceeds to block 532 where the compressed record file (C_rec_file) is uncompressed into the record file (rec_file). Next, at block 534, a recorder, such as the recorder discussed in association with step 402 of FIG. 4 is started in the play-back or simply play mode of operation. With the uncompressed record file (rec_file) as its input, the output from the recorder (in the play mode) is the reconstructed series of keystrokes, mouse clicks, audio signals, video signal and other input command signals that were generated at the source device during the editing of the original document. Thus, at step 536 an editing applications program, such as the one mentioned in association with steps 404 and 406 of FIG. 4 is commenced. Armed with the original version of the document, as well as the set of input commands and input signals that define how the document was edited at the source device, the editing process is carried out at the destination device at step 538. Upon completion, both the editing application and the recorder are exited at step 540. Thereafter, the edited file is stored at step 542. In conjunction therewith, the uncompressed record file is typically deleted from the destination device. At the end of steps 508, 518, 528, 530 and 542, flow branches back to step 502 in anticipation of the receipt of yet another transmission.

It will be appreciated by those skilled in the art that the present invention allows a source communications device to transmit a smallest amount of data and control information necessary to generate an edited version of a document at a destination device. Via this methodology, transmission resource requirements as well as associated cost requirements are minimized for both the wireless and wireline communications environments. While the immediate impact will be felt in the wireless arena, where spectral efficiency is at a premium, it will nonetheless be appreciated by those skilled in the art that similar concerns will arise in the wireline arenas as the throughput of wireline systems approaches the capacity of the wider bandwidth channels.

What is claimed is:

1. A method for minimizing an amount of data communicated between a source device and a destination device in order to modify a version of an electronic document stored at said destination device, said method comprising the steps at the source device of:

starting a recorder at the source device;

editing a version of the electronic document stored at the source device via a plurality of user input commands to create an edited version of the document while simultaneously capturing the plurality of user input commands with the recorder to provide a captured set of user input commands;

storing the captured set of user input commands as an input command file;

storing the edited version of the document in a file;

comparing an input command file size to a file size for the edited version of the document;

transmitting the edited version of the document to the destination device when the file size for the edited version of the document is smaller than the input command file size; and transmitting the captured set of user input commands to the destination device when the input command file size is smaller than the file size for the edited version of the document.

2. The method of claim 1 wherein the input command file and the file storing the edited version of the document are compressed prior to the step of comparing.

3. A method for minimizing an amount of data communicated between a source device and a destination device in order to modify a version of an electronic document stored at said destination device, said method comprising the steps at the source device of:

starting a recorder editing first a version of the electronic document stored at the source device via a set of user input commands to create an edited version of the document while simultaneously capturing the user input commands with the recorder to provide a captured set of user input commands;

storing the captured set of user input commands as an input command file;

storing the edited version of the document in a further file;

comparing the input command file size to a file size for the further file; and selecting the smaller of the input command file and the further file for transmission to the destination device.

4. A method for minimizing an amount of data communicated between a source device and a destination device in order to modify a version of an electronic document stored at said destination device, said method comprising the steps at the source device of:

starting a recorder editing a first version of the electronic document stored at the source device via a set of user input commands to create an edited version of the document while simultaneously capturing the user input commands with the recorder to provide a captured set of user input commands;

calculating a difference between the electronic document as stored at the source device and the edited version of the document;

storing the captured set of user input commands in a as an input command file;

storing the edited version of the document in an edited document file;

storing the difference in a difference calculation file;

comparing an input command file size to a file size for the edited document file;

selecting the smaller of the input command file and the edited document file;

comparing the size of the selected said smaller of the input command file and the edited document file to a file size for the difference calculation file;

selecting the file having a smallest size; and transmitting the file having the smallest size to the destination device in order to modify the version of the electronic document stored at the destination device.

5. The method of claim 4 further comprising the steps of compressing the input command file, the edited document file and the difference calculation file prior to the step of comparing.

6. The method of claim 4 wherein the step of transmitting further comprises the step of:

setting a status in a control field, said status identifying to the destination device the type of file being communicated.

7. The method of claim 4 wherein the step of calculating a difference is based upon a binary difference between the electronic document and the edited version.

8. The method of claim 4 wherein the step of calculating a difference is based upon format specific similarities between the electronic document and the edited version.

9. The method of claim 4 further comprising the steps of:

receiving at the destination device the file having the smallest size; and merging the file having the smallest size with the electronic document stored at the destination device in order to generate destination device modified version.

10. The method of claim 4 further comprising the steps of:
- receiving at the destination device the file having the smallest size;
- when the file having the smallest size is the captured set of user input commands, starting a recorder in a play mode of operation at the destination device; and
- applying the captured set of user input commands to the electronic document stored at the destination device in order to generate a modified version thereof.

11. An apparatus for minimizing an amount of data communicated between a source device and a destination device in order to modify a version of an electronic document stored at said destination device, said apparatus comprising:
- a user input device for generating a set of user input signals;
- a processor, coupled to the input device and memory, for editing a version of the electronic document stored in memory in accordance with the set of input signals to create an edited version of the document;
- said processor further comprising: recorder means for storing the set of input signals in a file; storage means for storing the edited version of the document in a file; means for comparing the input signal file size to a file size for the edited version of the document and means for selecting the smaller of the compared files; and
- a transmitter, coupled to the processor, for transmitting the smaller of the compared files to the destination device.

12. The apparatus of claim 11 wherein the first version stored at the source device is identical to the version of the electronic document stored at the destination device.

13. The apparatus of claim 11 wherein the input device is selected from the group consisting of: alphanumeric keyboards; keypads; joy sticks; mouses; electronic pens or wands; microphones; and touch screens.

14. The apparatus of claim 11 wherein the processor further operates to compress the input file and the edited document file prior to their comparison.

15. The apparatus of claim 11 wherein said processor is further for calculating a difference between the first version of the electronic document and the edited version of the document, storing the difference in a difference calculation file, comparing a file size for the difference calculation file to a smaller of the first version and the edited document file, selecting the file having the smallest size and communicating the file having the smallest size to the transmitter for transmission to the destination device.

16. The apparatus of claim 15 wherein said difference calculation is based upon a binary difference between the electronic document and the edited version thereof.

17. The apparatus of claim 15 wherein said difference calculation is based upon format specific similarities between the electronic document and the edited version thereof.

18. The method of claim 1 wherein the set of user input commands are selected from the group consisting of:
- key stroke signals;
- joy stick signals;
- mouse signals;
- audio signals; and
- video signals.

19. A method for minimizing an amount of data communicated between a source device and a destination device in order to modify a version of an electronic document stored at said destination device, said method comprising the steps at the source device of:
- editing a version of the electronic document stored via a set of user input hardware interrupts to create an edited version of the document;
- storing the set of user input hardware interrupts as an input command file;
- storing the edited version of the document in a file;
- comparing an input command file size to a file size for the edited version of the document;
- transmitting the edited version of the document to the destination device when the file size for the edited version of the document is smaller than the input command file size; and
- transmitting the input command file to the destination device when the input command file size is smaller than the file size for the edited version of the document.

20. The method of claim 19 wherein the set of user input hardware interrupts are selected from the group consisting of:
- key stroke signals;
- joy stick signals;
- mouse signals;
- audio signals; and
- video signals.

21. A method for minimizing an amount of data communicated between a source device and a destination device in order to modify a version of an electronic document stored at said destination device, said method comprising the steps at the source device of:
- editing a first version of the electronic document stored at the source device via a set of user input hardware interrupts to create an edited version of the document;
- storing the set of user input hardware interrupts as an input command file;
- calculating a difference between the electronic document as stored at the source device and the edited version of the document;
- storing the difference in a difference calculation file;
- comparing the size of the input command file to a file size for the difference calculation file;
- selecting the file having a smaller size; and
- transmitting the file having the smaller size to the destination device in order to modify the version of the electronic document stored at the destination device.

* * * * *